(12) United States Patent
Kirschenbuhler

(10) Patent No.: US 7,767,146 B2
(45) Date of Patent: Aug. 3, 2010

(54) SAMPLE CHANGER WITH BALANCE

(75) Inventor: Peter Kirschenbuhler, Herisau (CH)

(73) Assignee: Metrohm AG, Herisau (CH)

( * ) Notice: Subject to any disclaimer, the term of this patent is extended or adjusted under 35 U.S.C. 154(b) by 947 days.

(21) Appl. No.: 11/217,599

(22) Filed: Sep. 2, 2005

(65) Prior Publication Data
US 2006/0045805 A1 Mar. 2, 2006

(30) Foreign Application Priority Data
Sep. 2, 2004 (EP) .................................. 04020823

(51) Int. Cl.
*G01N 21/00* (2006.01)
(52) U.S. Cl. ...................................................... 422/63
(58) Field of Classification Search .................... 422/63
See application file for complete search history.

(56) References Cited
U.S. PATENT DOCUMENTS 4,136,750 A * 1/1979 Strickler ..................... 177/189

6,784,380 B2   8/2004   Weber et al.

FOREIGN PATENT DOCUMENTS

DE    3814959 A1 * 11/1989
DE    10158179      6/2003

OTHER PUBLICATIONS

Machine Translation of DE 3814959 A1. Date: Dec. 18, 2008.*
Abstract Summary Page for Waltz reference. Date: May 11, 2009.*

* cited by examiner

*Primary Examiner*—Walter D Griffin
*Assistant Examiner*—Bobby Ramdhanie
(74) *Attorney, Agent, or Firm*—Shoemaker and Mattare

(57) ABSTRACT

Sample changer with a balance, with at least two sample carriers which can be delivered to the balance and which are located in a sample rack, the sample carrier being made and arranged in the sample rack relative to the balance such that the sample carrier can be conveyed onto a weighing surface of the balance by rotation and/or shifting of the sample rack and/or the balance. Preferably, the balance is integrated in the sample changer.

8 Claims, 3 Drawing Sheets

SAMPLE CHANGER WITH BALANCE

FIELD OF THE INVENTION

The invention relates to a sample changer with a preferably integrated balance or preferably integrated weighing module, an automatic metering device with such a sample changer and a balance or a weighing module for one such sample changer.

BACKGROUND OF THE INVENTION

Sample changers are known in a large number for the most varied applications. Many sample changers have a carousel-like sample rack in which a plurality of positions, preferably equipped with sample vessels, can be triggered automatically. Sample changers with movable sample racks are also known. Sample changers are used for example for sampling, for synthesis, for analysis, etc.

Analysis systems automated with sample changers also often have a provision for connection to an external balance in order to determine the weight of a substance, for example the weight of a sample in automatic analysis devices (e.g. the weight of a titrant in a titration device) which is required for computation of a result. These devices with an external balance are known for example from the companies Mettler, Zymark, Metrohm, etc. Since in these systems the balance is generally not mechanically integrated into the process, considerable manual effort is necessary for example to determine the sample weight. Thus the sample vessel must be taken from the sample changer by hand and placed on the balance, in order to then be placed again by hand on the sample changer after manually weighing-in and taking up the weight. For example, a Zinsser Analytik weighing system is known which conveys the weighing vessel onto the balance and back into the sample rack again using a gripper arm. But the disadvantage in this device is the considerable mechanical effort; the device is accordingly expensive. The disadvantage is adverse effects on operating reliability since the reliability of a gripper arm is usually greatly influenced by the beaker diameter and its tolerance.

Document DE 101 58 179 discloses a sample changer for a comparator balance. The sample changer has a platform on which the sample carrier is mounted. The platform can be moved relative to the balance for delivering the individual units of weighed material onto the sample carriers. When the platform is lowered together with the sample carriers located on it, the ribs of the balance pan penetrate a plurality of recesses of the sample carrier such that a weight which is located on the sample carrier is positioned on the ribs and thus can be weighed. The disadvantage here is the relatively complex mechanism with a platform which can be lowered as a whole. Moreover reaching through the sample carrier by means of the ribs of the balance pan requires high-precision and thus often fault-susceptible mutual positioning and guiding of the balance pan and sample carrier.

SUMMARY OF THE INVENTION

Therefore the object of the invention is to overcome the disadvantages of what is known, especially therefore to make available a sample changer which enables higher precision in the determination of weight, and which moreover is easy to produce and is as low-maintenance or maintenance-free as possible.

The object is achieved according to this invention by a sample changer with a preferably integrated balance or a preferably integrated weighing module, an automatic metering device with such a sample changer, and a balance or weighing module for such a sample changer as described below.

A sample changer as claimed in the invention has a preferably integrated balance. The sample changer and balance or weighing module however can also be made and matched to one another such that they form separate units, but mechanically interact with one another when the sample carriers or a material to be weighed are delivered onto the balance. In the context of the present invention, a balance may mean either only the weighing module of e.g. a laboratory balance which is integrated into the sample changer; or a complete balance including the housing, operating part, etc. may be integrated into the sample changer. The sample changer has at least two sample carriers which are located in a sample rack and which can be delivered to the balance, and which are made and arranged in the sample rack relative to the balance such that the sample carrier can be delivered to the weighing surface of the balance by rotation and/or shifting of the sample rack and/or of the balance.

The sample rack can be made in the conventional manner, for example in the manner of a carousel or in a x, y matrix arrangement. In the case of carousel-like sample racks the change of position takes place by turning the sample rack around a middle axis, conversely for x, y matrix arrangements of the sample rack the position is changed by shifting the sample rack; of course combinations of carousel and x,y matrix arrangements are also possible, simultaneously or alternatively, for special applications.

In contrast to the prior art, the sample carriers are conveyed directly onto the weighing surface of the balance by rotation or shifting of the sample rack. This reduces the number of moving and thus fault-susceptible parts, since the entire sample rack need not be lowered and/or the balance raised.

According to one preferred embodiment of the sample changer, the sample carriers are arranged in the sample rack such that the sample carrier can be moved in the direction orthogonally to the direction of rotation and/or displacement of the sample rack and/or the balance, especially when the sample carrier is conveyed onto the weighing surface of the balance.

In this way, direct conveyance of the sample carrier onto the weighing surface of balance is enabled by rotating or shifting the sample rack. The sample rack need not be raised or lowered in its entirety; only the sample carriers are moved in the direction orthogonally to the direction of rotation and/or shifting of the sample rack. Here it is especially preferred that the sample carriers slide onto the weighing surface of the balance by rotation and/or shifting of the sample rack.

According to one especially preferred embodiment the sample carriers are located in recesses of the sample rack, especially of the rack bottom and optionally the rack top, preferably inserted or suspended. By dividing the sample rack into a rack bottom and a rack top, in the conventional manner improved static strength and positioning capacity of the vessels located on the sample carriers, such as for example test tubes, etc., are accomplished. By insertion or suspension, especially a floating support of the sample carrier, the above described movability of the sample carrier in one direction orthogonally to the direction of rotation and/or displacement of the sample rack can be induced. Moreover, in this way easy interchangeability of sample carriers is enabled: the sample carriers can be easily lifted out, preferably without using any tools.

According to another, especially preferred embodiment the sample carriers in the operating state project at least partially out of the rack bottom. When the sample changers are being conveyed onto the weighing surface of the balance, the sample carriers can thus change their position orthogonally to the direction of rotation and/or shifting of the sample rack, especially by sliding onto the scale surface.

The sample changers preferably have side bevels. These bevels enable sliding of the sample changers onto the weighing surface without difficulty, without tilting being able to occur, by which the operating reliability of the sample changer can be increased and fault susceptibility can be decisively lowered.

The invention furthermore relates to an automatic metering process, especially a liquid metering device, powder metering device and/or titration device, with a sample changer, the balance being integrated into the sample changer.

The sample changer as claimed in the invention makes it possible to integrate the balance into the sample changer based on the attained, simple capacity of the sample changer to slide onto the balance surface directly by rotation and/or shifting of the sample rack or the balance. Known analysis systems automated with sample changers have a connection possibility for an external balance. But this weighing process must be manually carried out. By integrating the balance into the sampler and by virtue of the capacity of the individual sample carriers to slide onto the weighing surface, a separate balance which would require additional space can be omitted. Moreover, the supplied amount for example of a titrant can now be determined directly via the weight which loads the individual sample carriers. Of course the above described advantages arise in conjunction with any type of metering devices, both for fluids and solids, for example therefore also powder metering devices or the like.

The invention relates furthermore to a balance, especially for the above described sample changer, the balance having lateral bevels in the edge area of the weighing surface. Commercial balances generally have a weighing surface, especially a weighing plate which sits on the base body of the balance. In the edge area of the weighing surface there is one edge in the transition area to the base body which is disadvantageous for the sample carriers' sliding onto the weighing surface. As described above, this sliding capacity can generally be ensured by the bevels of the sample carrier. But it is preferred that the balance itself in the edge area of the weighing surface has these bevels which are compatible preferably at an angle to the bevels of the sample carrier and which prevent titling of the sample carrier and the weighing surface of the balance when the sample carriers slide onto it. These bevels can be especially interchangeable and/or can completely or partially surround the weighing surface, for example can be made as a ring which can be positioned around the weighing surface. The balances to be used within the framework of the invention are familiar to one skilled in the art, e.g. laboratory balances, analysis balances, etc.

The invention furthermore relates to a process for changing the position of a sample rack in a sample changer, preferably for determining a weight which is located on a sample carrier, the sample carrier being supplied to the measurement or analysis device by turning and/or shifting the sample rack, especially being conveyed onto the weighing surface of a balance. Optionally, clearance of the rack bottom by minimum movement against the direction of rotation or shifting can be effected.

This invention makes it possible to allow the sample carrier to slide onto the weighing surface of a balance immediately by rotation and/or shifting of the sample rack. Lowering of the sample rack or moving the balance up is thus no longer necessary, whereby the number of moving parts can be reduced and thus the reliability can be significantly improved.

Preferably the above described process is an automated metering, especially liquid metering, powder metering and/or titration process.

Typically this process comprises the following steps:
conveying of a sample carrier to the weighing surface of a balance by rotating and/or shifting the sample rack and/or balance;
taring of the sample carrier and a weight which may already be located on it;
metering of a substance onto a sample carrier or into a vessel which is located on the sample carrier, for example a graduated flask, beaker, test tube, etc;
determining of the weight which is located on the sample carrier.

Thus, the amount or volume of the supplied substance can be determined by way of finding the difference of the weight which loads the sample carrier before and after adding the substance. The weight measurement is for example required to determine the result of automated titrations and other automatic metering processes.

BRIEF DESCRIPTION OF THE DRAWINGS

The invention is illustrated below using one preferred embodiment without the subject matter of the invention being limited to the illustrated embodiment.

DESCRIPTION OF THE PREFERRED EMBODIMENTS

Figure 1:
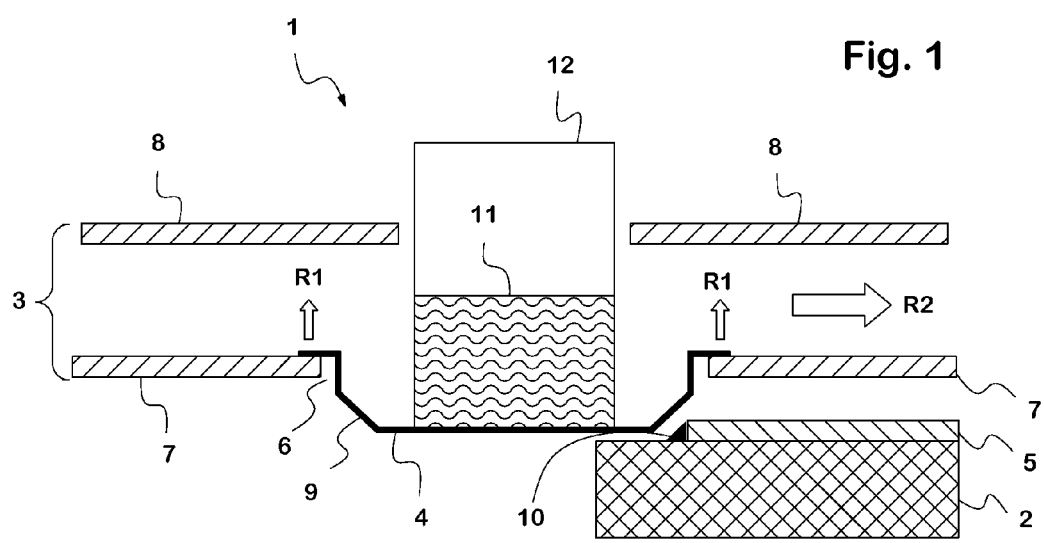
FIG. 1 shows a schematic extract of a sample changer with a sample carrier; not in the weighing position.

FIG. 1 exemplarily and schematically shows one preferred embodiment of a sample changer 1 according to the invention, the sample carrier 4 not being in the weighing position. The sample changer 1 comprises a sample rack 3 containing a rack bottom 7 and a rack top 8; the rack top 8, however, is not necessarily present. Both the rack top 8 as well as a rack bottom 7 in the embodiment have recesses 6. A sample carrier 4 which rests in the edge area of the recess 6 is inserted into the recess 6 of the rack bottom 7. Optionally the sample carrier 4 can have a guide area which enables a controlled displacement of the sample carrier in the direction R1 (or diametrically opposite thereto) without allowing significant movements in the direction R2 (or diametrically opposite thereto). On the sample carrier 4 there can be a vessel 12, in the embodiment already partially filled with a substance 11, or a sample which is to be titrated. In the illustrated embodiment the vessel 12 is surrounded by a recess in the rack top. The sample carrier 4 projects through the recess 6 of the rack bottom 7 in the direction of the balance 2 with a weighing surface 5 such that the bottom of the sample carrier 4 is located slightly lower than the top of the weighing surface 5 so that the sample carrier 4 can slide onto the weighing surface 5. When the sample carrier 4 is turned or shifted for example in the direction R2 the sample carrier 4 can slide onto the weighing surface, the sample carrier at the same time being raised in the direction R1 orthogonally to the direction R2. Movement of the sample rack 3 in the direction R1 is not necessary. Preferably the sample carrier 4 in the edge area facing the balance 2 or the weighing surface 5 has bevels 9 which enable simple sliding onto the weighing surface 5. Most preferably the balance 2 in the edge area of the weighing surface 5 also has these bevels 10 which further simplify the sample carrier's sliding. The bevels 9 and 10 can effectively prevent tilting of the sample carrier 4 on the weighing surface 5 as it slides. Of course the sample rack 3 can be made in the manner of a carousel or as a pure x, y matrix arrangement. Combinations thereof are suitable for special applications. Moreover positioning of the sample carrier on the balance can be effected both by rotation and/or shifting of the sample rack 3 (in the direction R2 or diametrically opposite) and also by rotation and/or displacement of the balance 2 (likewise in the direction R2 or diametrically opposite). Rotation and/or shifting of the sample rack 3 with a fixed arrangement of the balance is however preferred.

Figure 2:
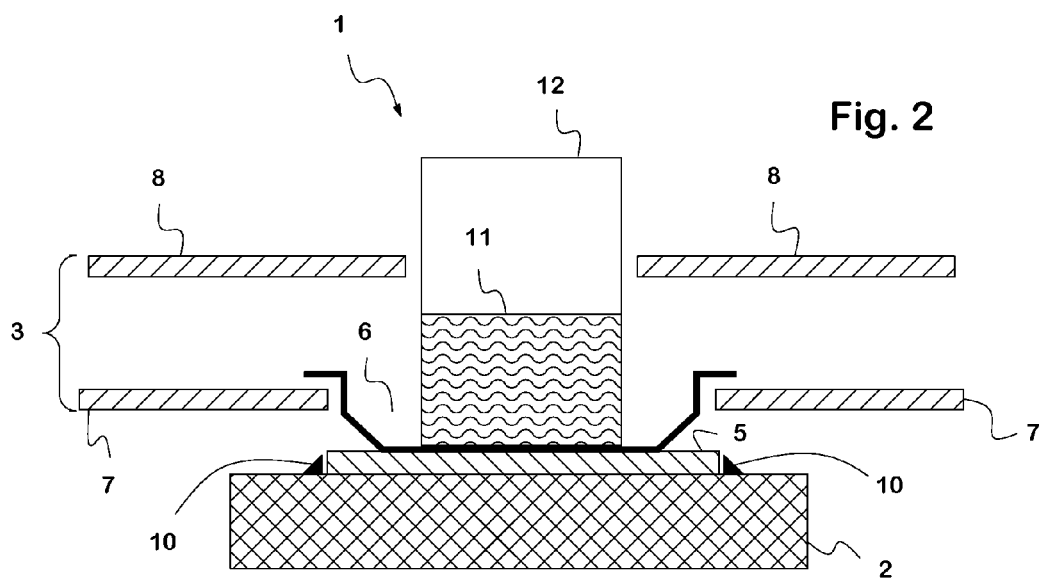
FIG. 2 shows a schematic extract of a sample changer with the sample changer; in the weighing position.

FIG. 2 schematically shows by way of an extract the preferred sample changer 1 as shown in FIG. 1, the sample carrier 4 now being located in the weighing position. Here the sample rack has been moved further in the direction R2, e.g. rotated or shifted and thus positioned on the weighing surface 5 of the balance 2. When the sample carrier 4 slides onto the weighing surface 5 of the balance 2 the sample carrier 4 has been lifted slightly, so that it loads the weighing surface with its entire weight. In the illustrated weighing position the sample carrier no longer rests in the edge area of the recess 6, by which precise weighing of the sample carrier and of the vessel 12 located on it, optionally with an added or metered substance 11, is enabled.

Figure 3:
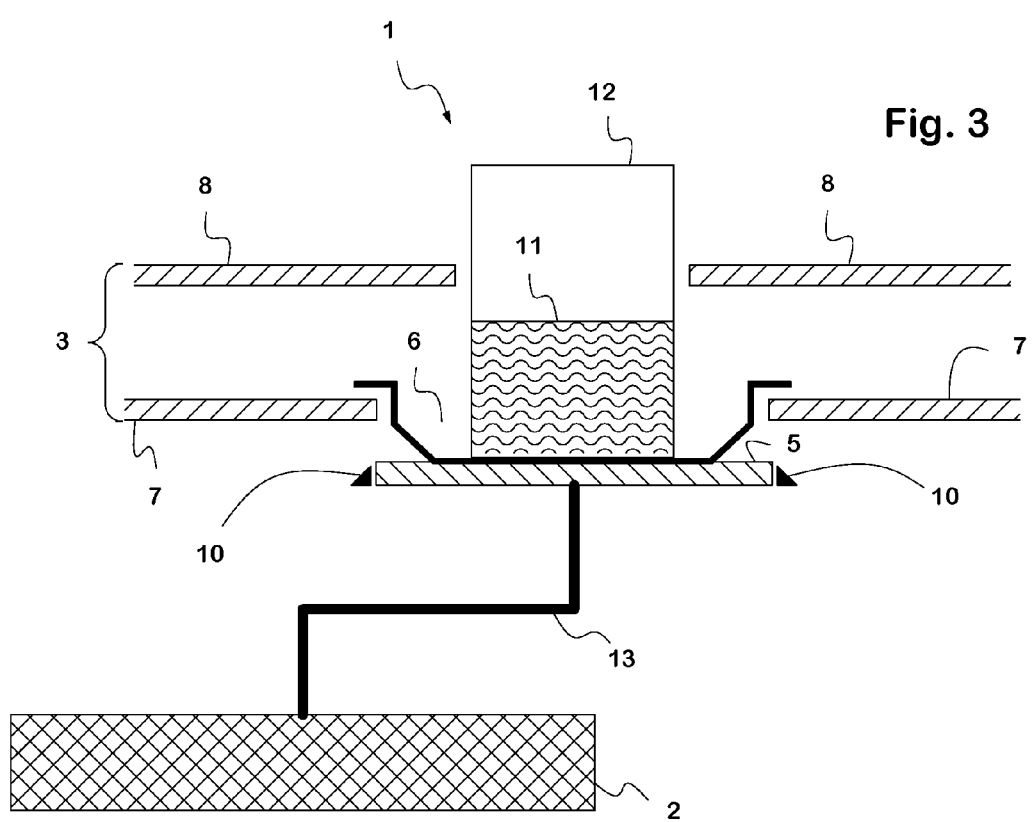
FIG. 3 shows a schematic extract of a sample changer in the weighing position; with power deflection.

FIG. 3 schematically shows by way of an extract one alternative embodiment of the invention. In a modification of the embodiment shown in FIG. 2, in FIG. 3 the weighing surface 5 is spatially separated from the balance 2 or the weighing module and by way of a device 13 for power deflection, for example a rod or the like, is in especially mechanical interaction. In the illustrated embodiment the direction of rotation or shifting, in contrast to FIG. 2, points out of the plane of the paper at the viewer or away from the viewer.

Figures 4, 5:
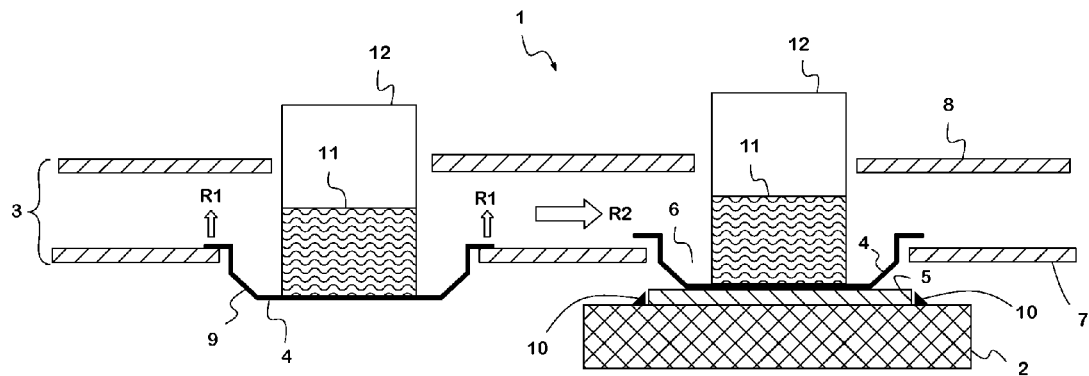
FIG. 4 shows a sample changer with two sample carriers, one in a weighing position as in FIG. 2 and one not in a weighing position as in FIG. 1.
FIG. 5 shows a schematic extract of an automatic metering device with a sample carrier according to FIG. 4.

FIG. 4 shows a sample changer 1 with two sample carriers 4, one in a weighing position and one not in a weighing position. FIG. 5 schematically shows an automatic metering device 20, represented by a broken line, comprising a sample changer 1 as shown in FIG. 4 and a liquid metering device 21.

The invention claimed is:

1. A sample changer comprising
a balance having a weighing surface, and
at least two sample carriers which can be delivered to the balance and which are located in a sample rack, wherein each sample carrier can be moved in a direction orthogonally to the direction of rotation and/or displacement of the sample rack, and said sample carrier can be conveyed onto the weighing surface of the balance by rotation and/or shifting of the sample rack only.

2. A sample changer as claimed in claim 1, wherein the balance is integrated into the sample changer.

3. A sample changer as claimed in claim 1, wherein the sample carriers are located in recesses of the sample rack.

4. A sample changer as claimed in claim 3, wherein the recesses of the sample rack are in the rack bottom and optionally the rack top.

5. A sample changer as claimed in claim 3, wherein the sample carriers are inserted or suspended in said recesses of the sample rack.

6. A sample changer as claimed in claim 1, wherein the sample carriers in the operating state project at least partially out of the rack bottom.

7. A sample changer as claimed in claim 1, wherein the sample carriers have lateral bevels.

8. An automatic metering device comprising the sample changer according to claim 1, wherein a balance is integrated into the sample changer or is in mechanical interaction with the sample changer.

* * * * *